United States Patent [19]

Iwasaki et al.

[11] Patent Number: 5,380,252
[45] Date of Patent: Jan. 10, 1995

[54] BICYCLE SPEED CHANGE ASSEMBLY

[75] Inventors: Yoshihisa Iwasaki, Osaka; Tohru Takeda; Masao Ohta, both of Saitama, all of Japan

[73] Assignees: Maeda Industries, Ltd., Osaka; Bridgestone Cycle Co., Ltd., Tokyo, both of Japan

[21] Appl. No.: 64,349

[22] Filed: May 20, 1993

Related U.S. Application Data

[63] Continuation of Ser. No. 910,170, filed as PCT/3P91/01702, Dec. 6, 1991.

[30] Foreign Application Priority Data

Dec. 8, 1990 [JP] Japan .................. 2-402111
Mar. 5, 1991 [JP] Japan .................. 3-65539

[51] Int. Cl.$^6$ ............................. F16H 9/00
[52] U.S. Cl. ............................. 474/77; 474/82
[58] Field of Search .................. 474/74, 77-82

[56] References Cited

U.S. PATENT DOCUMENTS

| | | | |
|---|---|---|---|
| 3,903,751 | 9/1975 | Dian | 74/217 B |
| 4,023,424 | 5/1977 | Ryan et al. | 74/217 B |
| 4,306,871 | 12/1981 | Nagano | 474/82 |
| 4,699,605 | 10/1987 | Jona | 474/82 |
| 4,878,884 | 11/1989 | Romano | 474/82 |
| 4,895,553 | 1/1990 | Nagano | 474/82 X |

FOREIGN PATENT DOCUMENTS

| | | | |
|---|---|---|---|
| 13136 | 1/1980 | European Pat. Off. | B62M 9/12 |
| 830162 | 7/1938 | France . | |
| 2610062 | 7/1988 | France . | |
| 55-22315 | 6/1980 | Japan | B62M 9/12 |
| 55-91478 | 7/1980 | Japan | B62M 9/12 |
| 60-191591 | 12/1985 | Japan | B62M 9/12 |

OTHER PUBLICATIONS

"Automobile Practical Handbook", 4th Ed., Sep. 25, 1982, pp. 711, 723-724 Edited by Zaidan Hojin Automobile Industry Assoc.

*Primary Examiner*—Thuy M. Bui
*Attorney, Agent, or Firm*—Michael D. Bednarek, Marks & Murase

[57] ABSTRACT

The following technical means is provided to achieve a chain shift operation with a minimum of the guide pulley travel distance, to improve speed change efficiency and operatability, and to prevent the speed change assembly from protruding sideward:

At a forward location of a sprocket cluster (2), a link base (8) of a pantograph link mechanism (12) is supported by a chain stay (7), and from this, an inner link (9) and an outer link (10) are extended. To respective free end portions of these links, there is connected a movable member (11), which pivotally supports a chain guide (15) which is elastically urged. The guide pulley travel control means (18) functions in such a way that when the pantograph link mechanism (12) is deformed, it would cause a guide pulley (13) of the chain guide (15) to move inward axially of the hub shaft and at the same time forwardly downward substantially along a radial path of the sprocket cluster (2).

8 Claims, 10 Drawing Sheets

PRIOR ART

Fig. 9

PRIOR ART

Fig. 10

BICYCLE SPEED CHANGE ASSEMBLY

This application is a continuation of application Ser. No. 07/910,170 filed as PCT/3P91/01702, Dec. 6, 1991.

FIELD OF THE INVENTION

The present invention relates to a bicycle speed change assembly wherein a cluster of sprockets is provided on a bicycle rear wheel, and a chain is selectively engaged with one of these sprockets to change bicycle speed.

BACKGROUND ART

Figure 9:
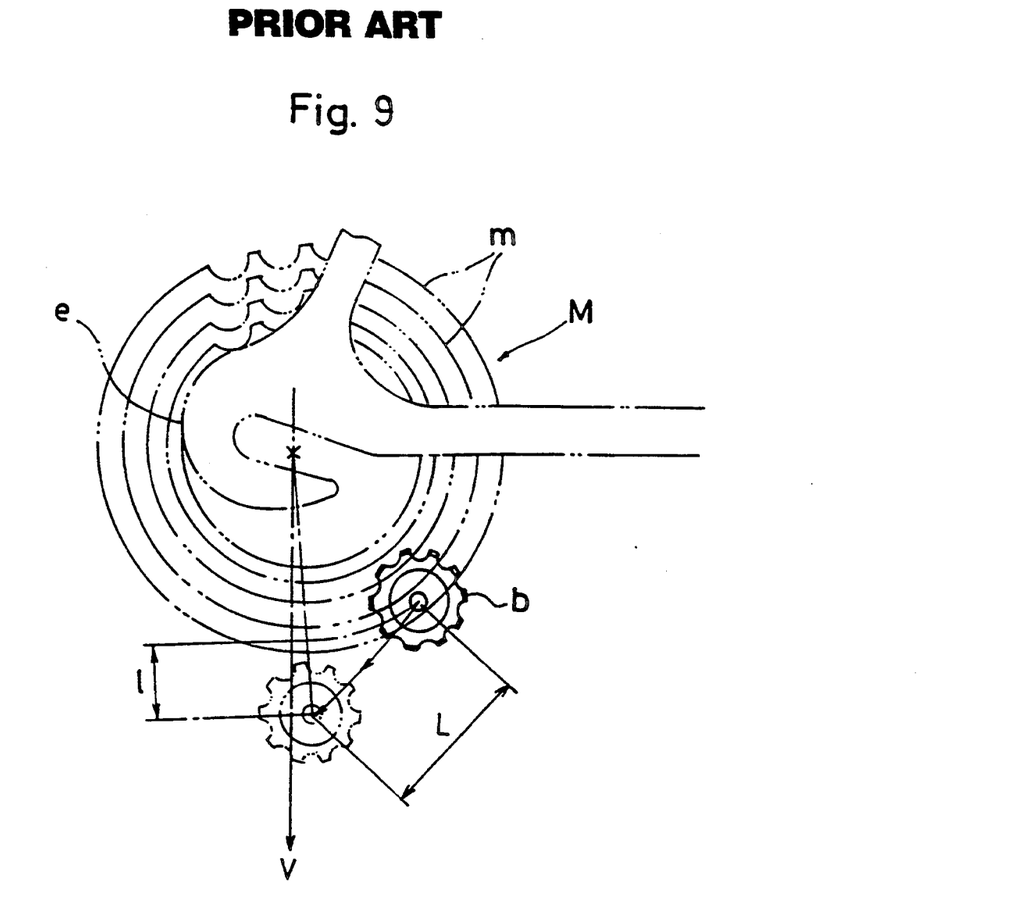
Figure 10:
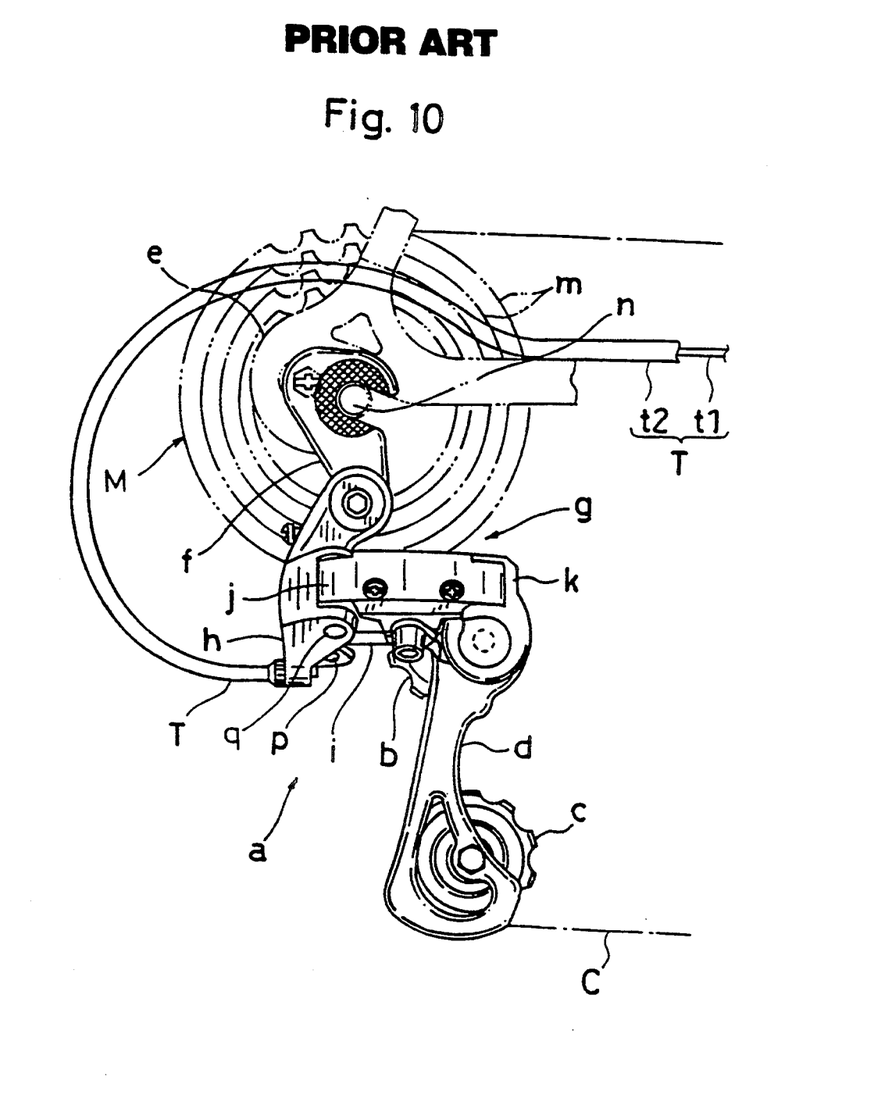
FIG. 10 is a side view of that prior art bicycle speed change assembly.

For the convenience of description, reference is now made to the attached FIGS. 9 and 10. As typically shown in FIG. 10, a prior art bicycle speed change assembly a (a rear speed change assembly) has a chain guide d which rotatably supports a guide pulley b and a tension pulley c. Via a shift link mechanism such as a parallelogram pantograph mechanism g, this chain guide d is supported on a rear end plate e at an end portion of a bicycle frame or on a bracket attached thereto, pivoted by an appropriate shaft while being urged in a direction to tension a chain C.

The pantograph mechanism g comprises a link base h supported by the bracket f, an inner and an outer links i and j which are pivotally connected to the base end of a link base h, and a movable member k. The inner and the outer links i and j extend forward. The movable member k is the place where the chain guide d is rotatably supported.

The chain guide d is elastically urged by a coil spring (not shown in the FIGS.) in the direction to urge the chain C, i.e. in the clockwise direction in FIG. 10. This is to eliminate slack in the chain C and to give an appropriate tension thereto.

With the above-mentioned arrangement, when the speed change cable T, which is connected to the pantograph mechanism g, is pulled or released with the use of speed change operation lever (not shown), the pantograph mechanism g deforms to cause the chain guide d, which is supported by the movable member k, to move inward axially of a hub shaft n, forcing the chain C to move over to a desired sprocket m of the sprocket cluster M.

In this type of speed change assembly a, it is desirable for the sake of improved speed changing performance that the teeth areas of the guide pulley b and each sprocket m on the sprocket cluster M should be within an appropriate proximity because the guide pulley b is the member responsible for moving a portion of the chain onto a target sprocket before it is engaged with the teeth of a present sprocket. If the guide pulley and the clustered sprockets are located too far away from each other, the guide pulley will have to travel over a long distance to complete a chain shift operation, resulting in a poor speed change response.

For this purpose, it is desirable to design the speed change assembly in such a way that the chain guide d would not travel in parallel to the hub shaft n but to travel along a line practically parallel to a line defined by connecting each edge of sprocket m of the cluster M, or to travel in a manner that the distance between each sprocket m and the guide pulley b would be substantially constant. The sprocket cluster M usually has a structure wherein a sprocket of a greater diameter is placed closer to the hub shaft. For the guide pulley b, this means that as it moves axially inward of the hub, it must move away from the hub shaft n.

As shown in FIG. 10, this is achieved in prior art typically by either; structuring the pantograph mechanism g by supporting the link base h below the hub shaft n and making the inner and the outer links i and j extend forwardly from this link base h and thereby slanting the pivotal shaft p and q of the inner and outer links i and j by an appropriate angle off the vertical, or otherwise, by rotatably supporting the link base h against the bracket f. By so doing an arrangement was made so that the guide pulley b would travel rearwardly downward, as shown in FIG. 9, as it moves axially inward of the hub shaft, while it maintains a substantially constant distance between itself and each corresponding sprocket m.

A problem with this type of prior art arrangement, however, is that when the pantograph mechanism g deforms, the guide pulley b supported by the chain guide d approaches the vertical V which runs through the hub shaft, as shown in FIG. 9. This makes the guide pulley b's travel l away from the sprocket M significantly smaller than the actual travel L of the guide pulley b. As a result, it is necessary in prior art arrangement that as the sprocket's gear ratio increases, a greater slant angle has to be provided for the pivotal shafts p and q, resulting in a greater amount of deformation necessary for the pantograph g, and longer pull for the speed change operation cable T. All of these pose a problem of increased overall size of the speed change assembly and the speed change lever.

Another problem with the prior art speed change assembly is that the great deformation of the pantograph link mechanism g and the resulting length of the pull of cable T pose an inherant techinical hurdle against improved operatability of the speed change operation.

Further, since the guide pulley b has to travel over a long distance, the slack in the chain C has to be correspondingly great, resulting in a long and heavy weight of the chain C, putting a limit to the weight reduction of the bicycle.

There is still another disadvantage in the prior art speed change assembly: Since the speed change mechanism a has to be mounted at an outermost location of the overall width of the bicycle, it is very susceptible to damage in case of a bicycle rollover. Especially on bicycles specifically designed for off-road cycling, popularly known as mountain bikes, the end of the speed change mechanism a is apt to catch bush or other obstacles, interfering with the speed change function.

A further problem is that since the link base h is located behind the speed change mechanism a, the speed change operation cable has to be introduced to the speed shift mechanism a from behind thereof. As a result, the cable T, originally coming from ahead, has to be curved in a U shape at the back or the side of the hub shaft, making a large loop extending toward the rear or the side of the bicycle, posing a additional safety problem that the speed change mechanism a or the loop may catch another bicycle or a pedestrian passing in proximity.

There is still another problem with this type of prior art arrangement. The speed change cable T, which usually comprises an inner cable t1 and a sheathing outer cable t2, must be laid in a U shape, and this adds a length to the cable T, as well as it increases the sliding resistance between the inner and the outer cables t1 and t2. This in turn increases the turning resistance of the speed change operation lever, decreases the operatability thereof, and in addition, calls for a great spring force for returning movement thereof, and results in a difficulty of producing smaller and lighter speed change assemblies.

DISCLOSURE OF THE INVENTION

It is therefore an object of the present invention to provide a bicycle speed change assembly enabling an appropriate speed change operation with a minimum amount of the guide pulley travel, speed change cable travel and operating force, and thereby increasing the speed change efficiency and operatability.

Another object of the present invention is to provide a bicycle speed change assembly which is smaller and lighter, and is less susceptible to damage in case of a bicycle rollover and other accidental events.

The present invention is a bicycle speed change assembly wherein a speed change operation is achieved by shifting a chain from one to another selected sprocket of a sprocket cluster mounted on a rear wheel of a bicycle, comprising:

- a pantograph link mechanism including a link base supported on a chain stay ahead of a sprocket cluster mounted on a hub shaft, inner and outer links each having a base end pivoted to the link base and extending rearward, and a movable member pivoted to respective free ends of these inner and outer links;
- a chain guide rotatably supporting a guide pulley and a tension pulley, supported on the movable member of the pantograph mechanism to pivot about a shaft in parallel to the hub shaft while being elastically urged to tension a chain; and
- a guide pulley travel control means for moving the guide pulley inward axially of the hub shaft and forwardly downward substantially along a radial path of the sprocket cluster when the pantograph mechanism is deformed.

Other objectives, characteristics and advantages of the present invention will be described in more detail in the later description of the preferred embodiments and attached drawings.

BRIEF DESCRIPTION OF THE ATTACHED DRAWINGS

FIGS. 9 and 10 are views to show functions of prior art bicycle speed change assemblys: FIG. 9 shows functions of a prior art bicycle speed change assembly, whereas

BEST MODE FOR CARRYING OUT THE INVENTION

FIGS. 1 through 4 show a first embodiment of a bicycle speed change assembly according to the present invention.

Figure 1:
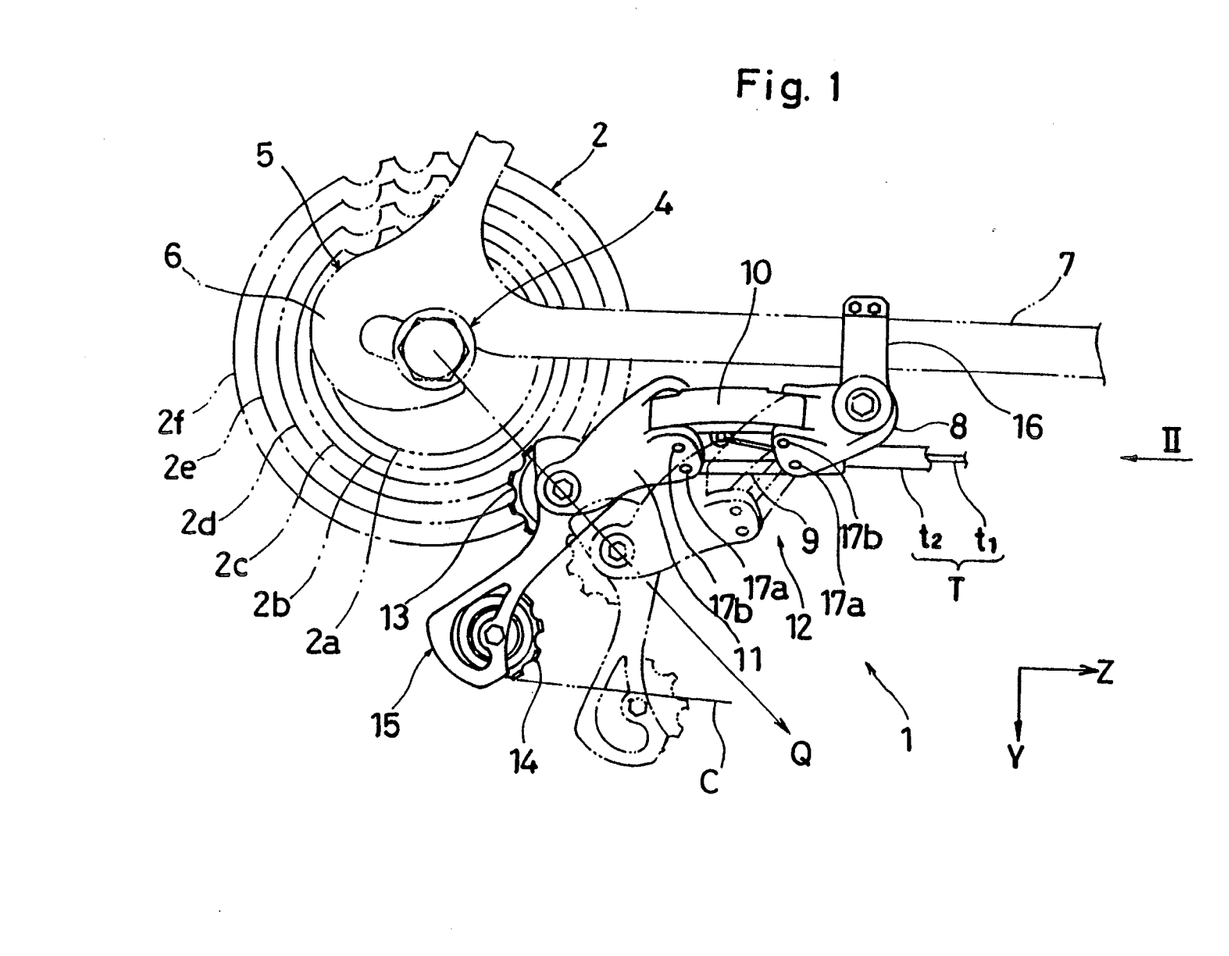
FIG. 1 is a side view of a first embodiment of a bicycle speed change assembly according to the present invention.
Figure 2:
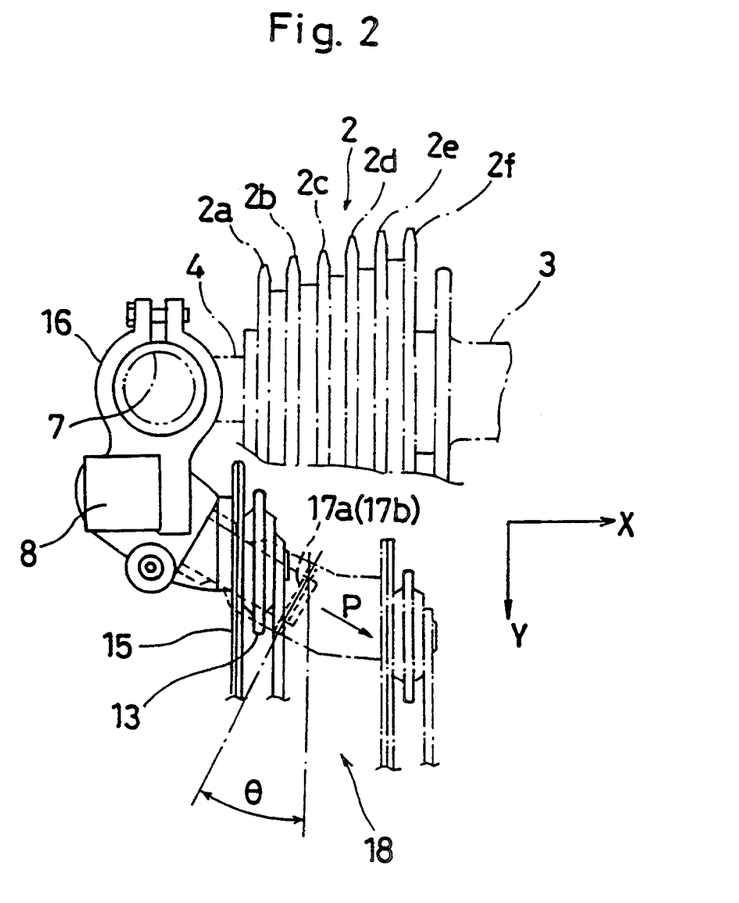
FIG. 2 is a view of the bicycle speed change assembly shown in FIG. 1 as viewed from a direction indicated by Arrow II.

As shown in FIGS. 1 and 2, at a rear portion of a bicycle to which a speed change assembly 1 according to the present invention is applied, a hub shaft 4 is supported by a rear end plate 6 of a bicycle frame 5 in the same manner as in prior art. This hub shaft rotatably supports a sprocket cluster 2 and a hub 3, On the other hand, the speed change assembly 1 according to the present invention is mounted ahead of the hub shaft 4 or the sprocket cluster 2. The speed change assembly 1 according to the present invention employs at least 4 component members; a link base 8 which is supported at an intermediate portion of a chain stay 7 extending forward from the rear end plate 6; an inner link 9 and an outer link 10, each of which are pivotally connected to the link base 8 at a respective base end portion thereof; and a movable member 11 which is pivotally connected to each free end portion of the inner and outer links 9 and 10. These four component members collectively define a pantograph mechanism 12. The speed change assembly further employs a chain guide 15 on the movable member 11 to support a guide pulley 13 and a tension pulley 14 rotatably. This guide pulley is rotatably supported and is urged so that it would tension the chain C about a shaft in parallel to the hub shaft 4.

Also in this embodiment, a speed change cable T, comprising an inner cable t1 and a sheathing outer cable t2, is laid so that it would orient toward the front face of the speed change assembly. An end of the outer cable t2 is fastened to the link base 8, whereas the inner cable t1, which extends rearwardly out of the outer cable t2, is fastened to an intermediate inner portion of the outer link 10. This arrangement allows that when the inner cable t1 is axially pulled against the outer cable t2, the pantograph link mechanism 12 would deform inward axially of the hub shaft. It should be appreciated to mention here that the link base 8 according to the present invention is mounted via a bracket 16 which is clamped around the chain stay 7. Furthermore, the pantograph link mechanism 12 is elastically urged by a spring (not shown) so that it would tend to move away from the hub shaft.

In this embodiment, the pivotal shafts 17a and 17b of the inner and outer links 9 and 10 of the pantograph mechanism are slanted, as shown in FIG. 2, so that the bottom ends of which would be displaced outwardly instead of extending vertically. In this FIG. 2, these shafts are slanted in the clockwise direction at an appropriate angle $\theta$, thereby constituting a guide pulley travel control means 18. Slanting the pivotal shafts 17a and 17b off the vertical causes the movable member 11 of the pantograph mechanism 12 to travel inwardly toward the hub shaft (the direction indicated by Arrow X in FIG. 2,) and at the same time in a rightwardly downward direction (Arrow P in FIG. 2.).

With the above-mentioned arrangement, when the inner cable t1 of the speed change cable T is pulled to deform the pantograph mechanism 12, the guide pulley 13, as shown by the phantom lines in FIGS. 1 and 2, travels inward axially of the hub shaft (FIG. 2, Arrow X), and at the same time, forwardly downward along a radial path of the sprocket cluster 2 (FIG. 1, Arrow Q.) In other words, the guide pulley 13 will travel substantially along a generating line of the truncated cone defined by connecting each edge 2a... 2f of the clustered sprockets in a forwardly downward direction.

As has just been described, because the guide pulley 13 travels substantially along a generating line of the truncated cone defined by connecting each edge 2a... 2f of the clusters, which runs in a forwardly downward direction, the travel of the guide pulley 13 necessary to move the chain C from the smallest sprocket 2a to the largest sprocket 2f will be minimized.

Now, since the travel of the guide pulley 13 is minimized, the pivotal movement of the inner and outer links 9 and 10 needed for speed change will be remarkably smaller than has been required in prior art link mechanisms. This makes it possible to reduce the length of the links 9 and 10 and thereby enabling the miniaturization of the speed change assembly.

Also, a smaller pivotal movement of the inner and outer links 9 and 10 leads to a smaller pull/release motion of the inner cable t1, resulting in an improved efficiency in the speed change operation. Furthermore, it now requires a smaller travel distance of the speed change lever, and therefore, it is also possible to miniaturize the speed change lever assembly.

There is still another advantage in this embodiment: As the guide pulley 13 travels inward axially of the hub shaft (FIG. 2, Arrow X,) or as it approaches the largest sprocket 2f, it moves forward (FIG. 1, Arrow Z.). This reduce the amount of slackness of the chain C needed for an appropriate tension thereof, and results in a shorter length of the chain C to decrease the overall weight and production cost of the bicycle.

Still another advantage of this embodiment is that, as shown in FIGS. 1 and 2, since the speed change assembly 1 is mounted at a lower part of an intermediate portion of the chain stay 7, the speed change assembly 1 would not extend to the outermost position of the bicycle width. This provides less chance for major damage to the speed change assembly in case of a bicycle rollover. Also, when the present invention according to this preferred embodiment is applied to a mountain bike, it provides less chance for the bike to be caught at the speed change assembly portion by bush, tree or any other obstacles A further advantage is that the operation cable T can approach the link base 8 from ahead of the speed change assembly. This eliminates the need for the cable T to be laid in a U-shape or any other curved patterns, contributing further to the riding safety by eliminating chances for the speed change assembly 1 or the cable T to catch other bicycles, pedestrians or obstacles. Also, the shortened length of the cable T decreases the sliding resistance between the inner and outer cables t1 and t2, and in turn, decreases the demand for a greater pull by the return spring, contributing to an improved operatability, and decreased size and weight of the speed change assembly.

Figure 3:
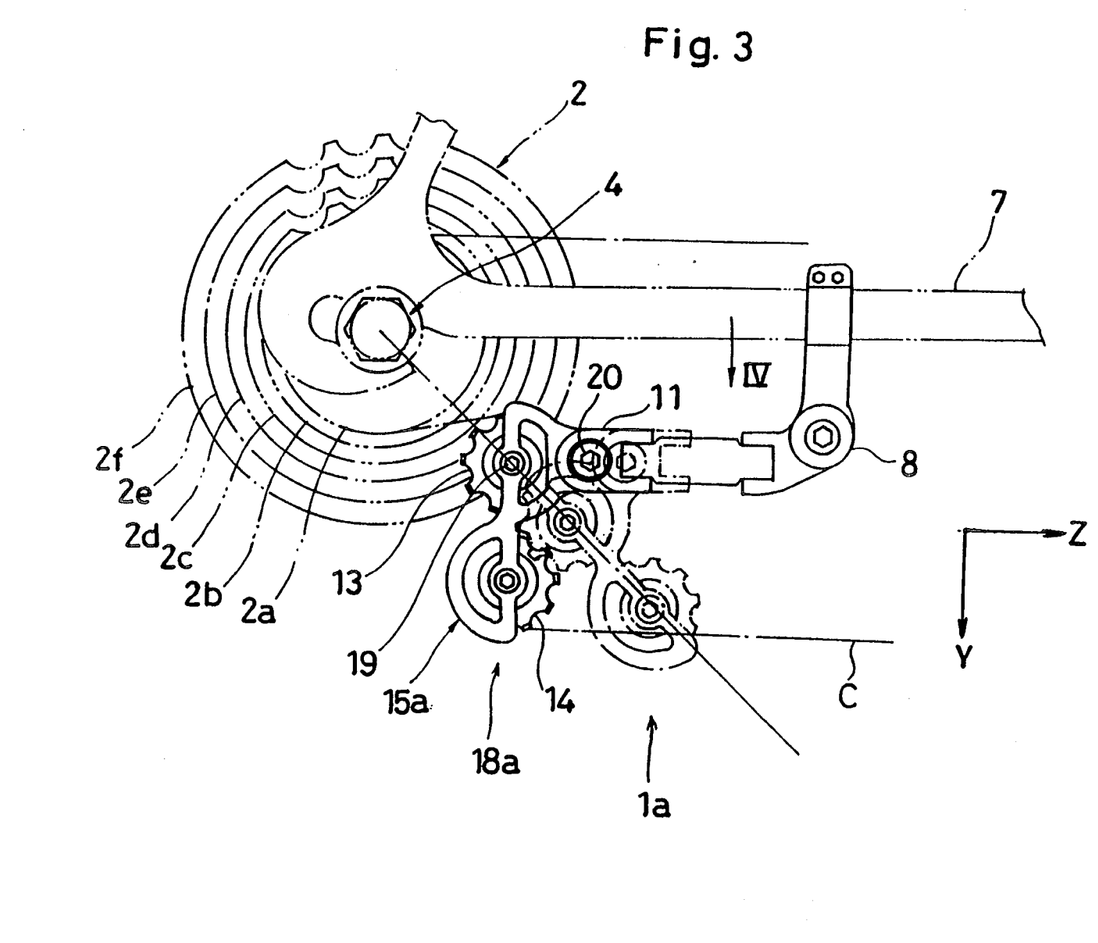
FIG. 3 is a side view of a second embodiment of a bicycle speed change assembly according to the present invention.
Figure 4:
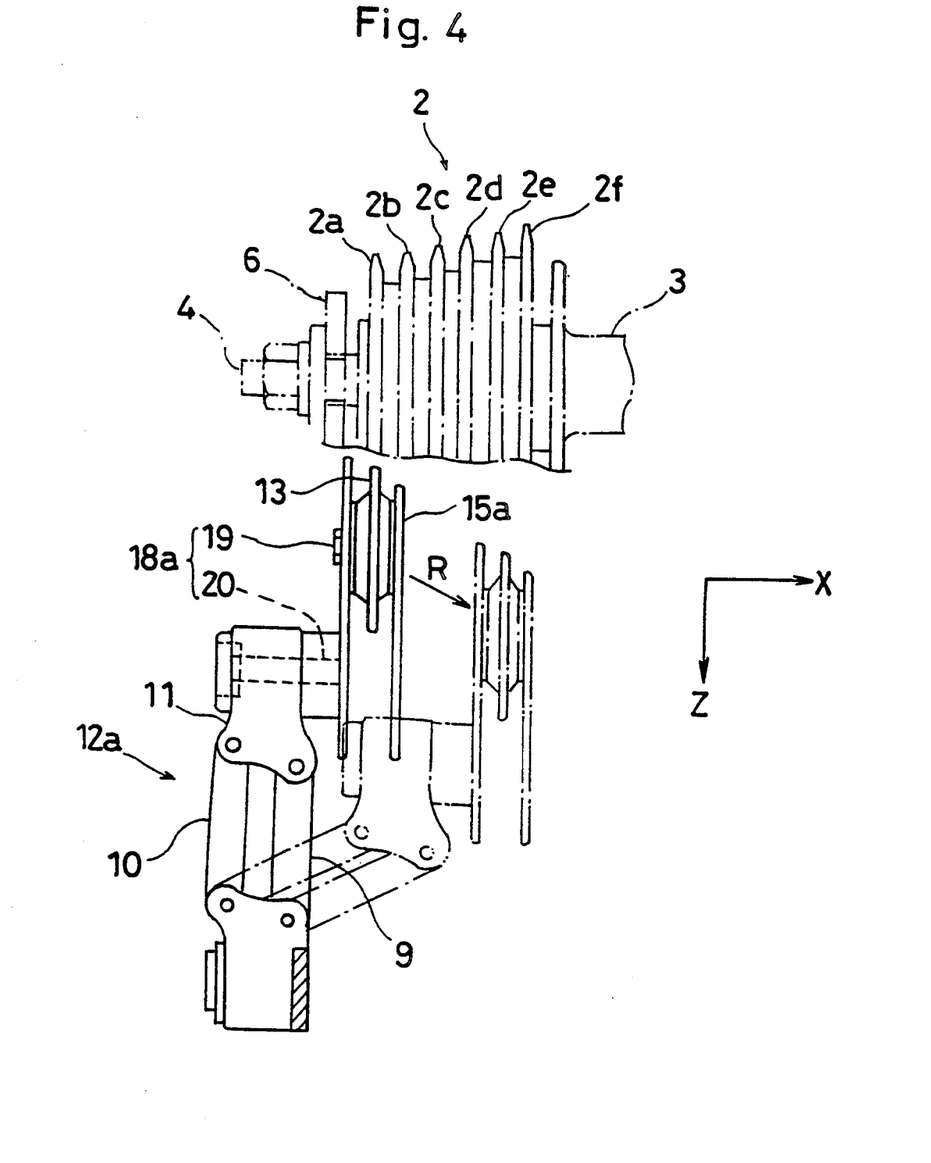
FIG. 4 is a view of the bicycle speed change assembly shown in FIG. 1 as viewed from a direction indicated by Arrow IV.

FIGS. 3 and 4 show a second embodiment of the present invention.

In this embodiment, a so-called triangle balance chain guide 15a is used for the guide pulley travel control means 18.

In the same way as in the first embodiment, it uses a pantograph mechanism 12a comprising a link base 8 which is supported by the chain stay 7 ahead of the sprocket cluster 2 supported around the hub shaft, an inner and an outer links 9 and 10 whose base end portions are pivotally supported at the end portion of the link base 8, and a movable member 11 pivotally supported at respective free ends of these links. Also, on the movable member 11 of this pantograph mechanism 12a, there is rotatably supported a chain guide 15a which in turn supports a guide pulley 13 and a tension pulley 14 rotatably. The guide pulley 13 is elastically urged in a direction to tension the chain C about a shaft in parallel to the hub shaft 4.

The guide pulley travel control means 18a according to this embodiment, as shown in FIGS. 3 and 4, is configured by rearwardly displacing the turning shaft 19 of the guide pulley 13 against the pivot shaft 15a of the chain guide 15a.

With the arrangement described hereabove, when the inner cable t1 is pulled to deform the pantograph mechanism 12a, the chain guide 15a travels inward axially and forwardly downward as shown in FIG. 4 (Arrow R,) to face with a desired sprocket, causing the chain C to shift onto that sprocket. This decreases the slack in the chain, adding a tension to the chain C, and as shown by the phantom line in FIG. 3, the chain guide 15a will turn counterclockwise around the pivotal shaft 20. This swing movement of the chain guide 15a then causes the guide pulley 13 to move downward, and as a result, the guide pulley 13 moves inward, approaching the hub shaft (FIG. 4, Arrow X,) and at the same time, moves forwardly downward substantially along a radial path of the sprocket cluster, attendant with the swing movement of the chain guide 15a triggered by the tension change in the chain C. Thus, in this second embodiment, the travel of the guide pulley 13 is substantially parallel to a downwardly forward generating line of the truncated cone defined by connecting edges of each cluster sprockets 2a... 2f, achieving the same goal as in the first embodiment of minimizing the travel of the guide pulley 13.

As a result, the amount of deformation needed for the pantograph mechanism 12a can be decreased, while at the same time the amount of pull/release for the speed change cable T may be correspondingly decreased.

The overall effect is that in the same way as the first embodiment, this second embodiment improves the speed change efficiency, enabling a miniaturized and light-weighted speed change mechanism a and a speed change operation lever, as well as a shorter length of the bicycle chain.

Further, the fact that the speed change mechanism 1a according to this embodiment is mounted in the same position as in the first embodiment at a lower portion of the chain stay 7 provides the same advantage of lessened chance for damage on the speed change assembly 1a in case of a bicycle rollover.

Likewise, the operation cable T can approach the link base from ahead thereof, eliminating the U-shaped layout of the cable to the rear or the side of the bicycle. This makes it possible the use of shorter operating cable with a smaller sliding resistance between the inner cable t1 and the sheathing outer cable t2. In addition, this arrangement also makes it possible to use a smaller, weaker return spring. All of these contribute, in the same manner as the first embodiment, to a remarkably improved speed change efficiency and a miniaturized, light-weighted speed change system.

Figure 5:
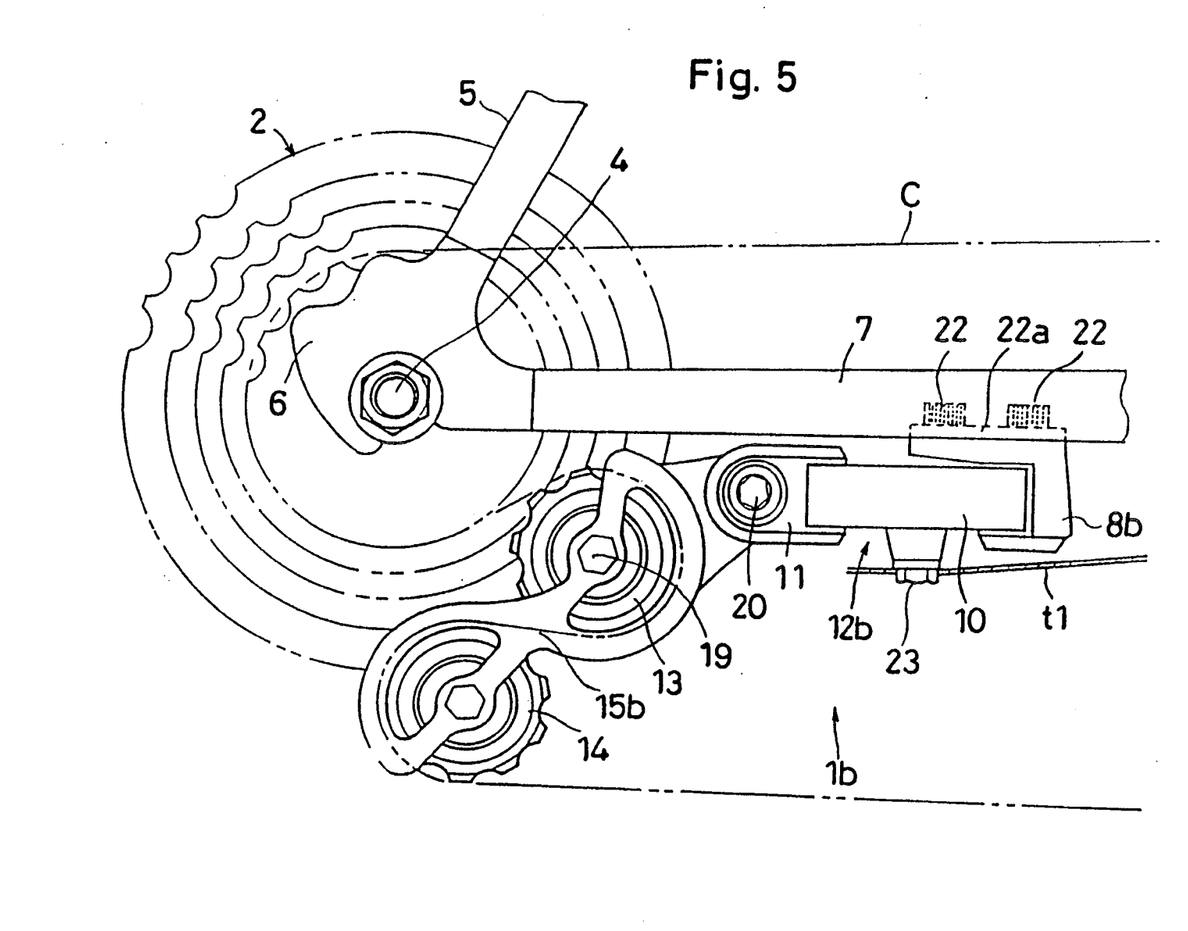
FIG. 5 is a side view of a third embodiment of a bicycle speed change assembly according to the present invention.
Figure 8:
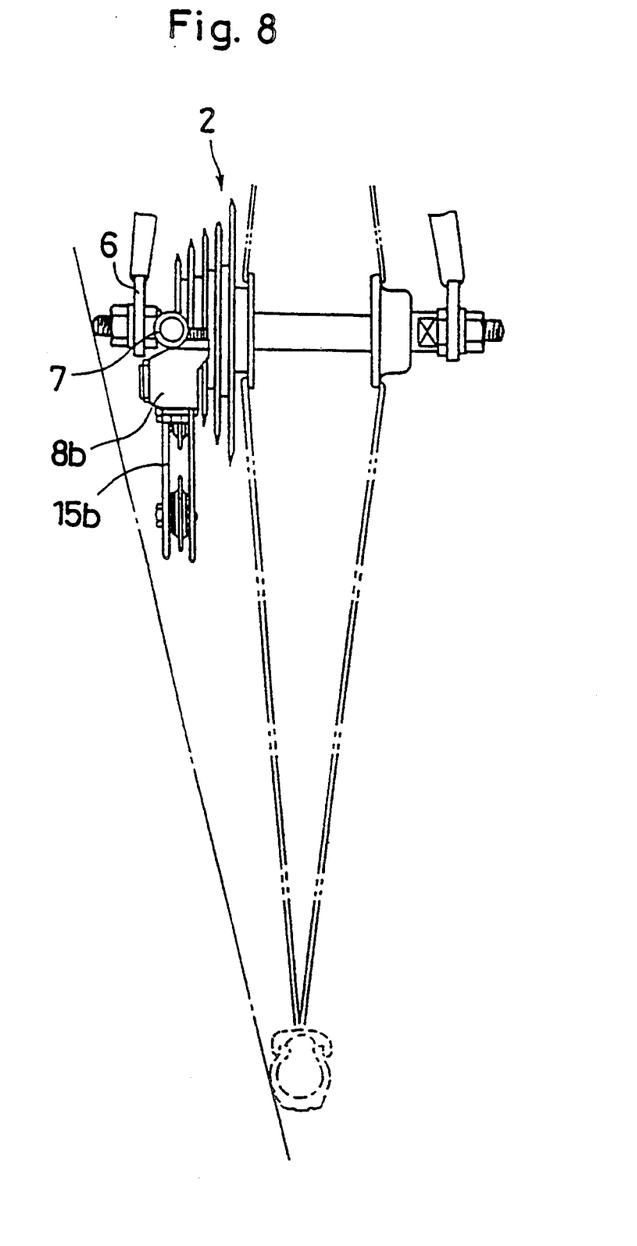
FIG. 8 is a rear view of a rear wheel of a bicycle as mounted with the speed change assembly shown in FIG. 3.

FIGS. 5 and 8 show a third embodiment of a bicycle speed change assembly according to the present invention.

In this embodiment, too, the same type of a triangle balance chain guide 15b as in the second embodiment is employed as the guide pulley travel control means 18.

In other words, the speed change assembly 1b uses a pantograph mechanism 12b comprising a link base 8b which is supported by the chain stay 7 ahead of the sprocket cluster 2 supported around the hub shaft, an inner and an outer links 9 and 10 whose respective base end is pivotally supported at an end portion of the link base 8b, and a movable member 11 pivotally supported at the respective free ends portion of these links. Also, on the movable member 11 of this pantograph mechanism 12b, there is rotatably supported a chain guide 15a which in turn supports a guide pulley 13 and a tension pulley 14 rotatably. The guide pulley is elastically urged in a direction to tension the chain C about a shaft in parallel to the hub shaft 4. In this embodiment, however, the link base 8b is fastened by a screw 22 onto a bracket provided at an inner location of the chain stay 7.

As shown in FIG. 5, the guide pulley travel control means 18b according to this embodiment, too, is configured by displacing rearwardly the shaft 19 of the guide pulley 13 against the pivotal shaft 20 of the chain guide 15b. As a result, when the pantograph link mechanism 12b is deformed, the guide pulley 13 moves axially inward of the hub shaft (FIG. 7, Arrow X,) and at the same time forwardly downward substantially along a radial path of the sprocket clusters, attendant with the swing movement of the chain guide 15b caused by the tension change in the chain C, and thus achieving the same effect as in the first and the second embodiments of minimizing the travel of guide pulley 13 and thereby making smaller the deformation of the pantograph mechanism 12b.

Figure 6:
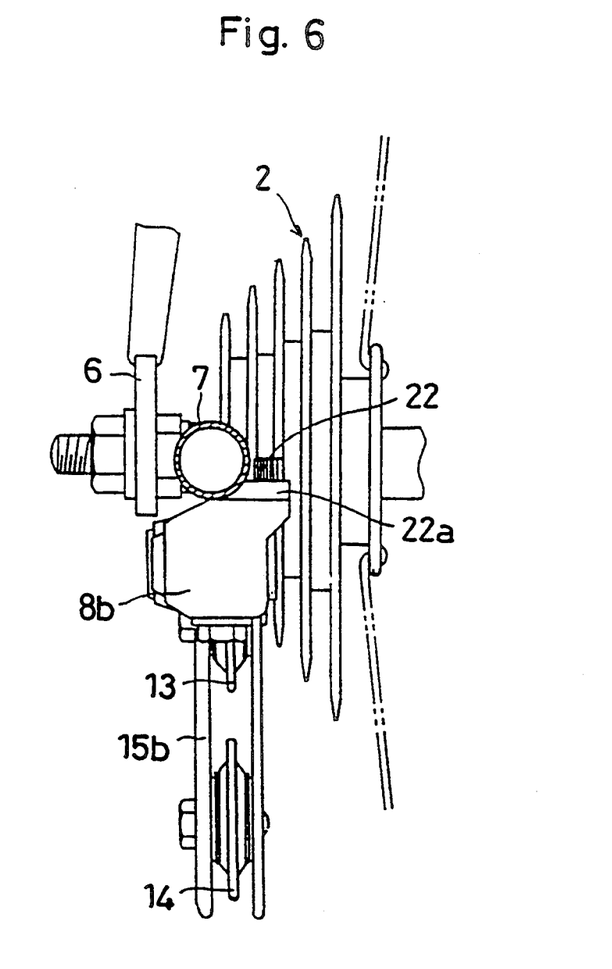
FIG. 6 is a front view of the bicycle speed change assembly shown in FIG. 5.

As most clearly shown in FIGS. 6 or 8, the speed change assembly 1b does not extend to an outermost location, either, in this embodiment, with a smaller risk for the speed change assembly of receiving a major damage in case of a bicycle rollover.

Figure 7:
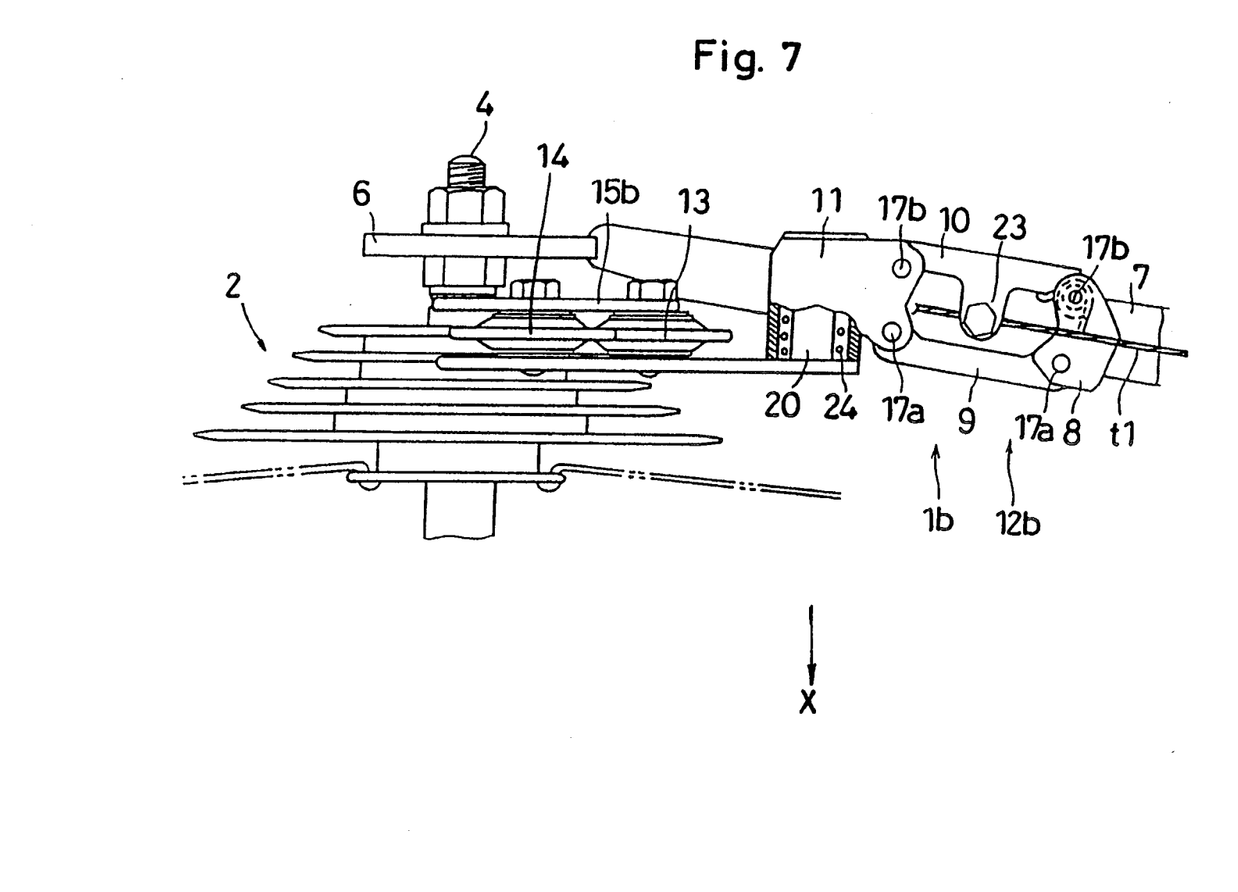
FIG. 7 is a view of the bicycle speed change assembly shown in FIG. 5 as viewed from the bottom.

One of the outstanding advantage in this embodiment is that, as shown in FIG. 7, the speed change operating cable T comprises an inner cable t1 alone, and this inner cable t1 is laid straightly, running rearward along the chain stay 7, and is connected to a fastener means 23 located at an intermediate inner portion of the outer link 10 of the pantograph mechanism 12b.

Because of this arrangement, the speed change assembly 1b or the operating cable T does not extend rearward or sideward of the bicycle, remarkably lessening the chance for the speed change assembly 1b and the operating cable T to catch foreign articles even in cycling in proximity to pedestrians and other obstacles, contributing significantly to the cycling safety.

Another advantage of using the inner cable t1 alone, without the sheathing outer cable t2, is that this eliminates the otherwise unavoidable sliding resistance between the inner and outer cables t1 and t2 which develops near the speed change mechanism. As a result, this assembly requires further less force for speed change operation, achieving a significant improvement in the speed change operatability.

As has been described so far hereinabove, the present invention minimizes the guide pulley travel necessary for an appropriate chain shifting operation. Further, by decreasing the amount of the pull/release length of the operating cable and the operating force required for it, greater speed change efficiency and operatability has been achieved, in addition to the possibility for a miniaturized and light-weighted unit as well as a superior mounting location which provides more protection against damages caused in a bicycle rollover.

Additionally, the design which prevents the speed change mechanism and the operating cable from being laid rearwardly or sidewardly of the bicycle provides an aesthetically superior appearance.

The present invention being thus far described, the scope of the present invention should not be confined or limited to those already discussed in the embodiments hereinabove, and it should be noted that there are many ways for variation.

For instance, the direction of the pivotal shafts may be varied: In the second and the third embodiments, the pivotal shafts for the inner and outer links 9 and 10 of the pantograph mechanisms 12a and 12b are set practically vertical; however, they may be slanted at an appropriate angle off the vertical, as is so arranged in the first embodiment so that the advantages achieved in the first embodiment may be shared also in the second and third embodiments.

Other possible variations may include: Instead of the operating cable T used in the first and the second embodiments, which comprises an inner and an outer cables t1 and t2, the operating cable comprising an inner cable alone, may of course be employed.

We claim:

1. A bicycle speed change assembly comprising:
   a pantograph link mechanism including a link base supported on a chain stay ahead of a sprocket cluster mounted on a hub shaft, inner and outer links each having a base end pivoted to said link base and extending rearward, and a movable member pivoted to respective free ends of said inner and outer links;
   a chain guide rotatably supporting a guide pulley and a tension pulley, said chain guide being supported on said movable member of said pantograph mechanism to pivot about a shaft in parallel to said hub shaft while being elastically urged to tension a chain; and
   a guide pulley travel control means for moving said guide pulley inward axially of the hub shaft and forwardly downward substantially along a radial path of said sprocket cluster when said pantograph mechanism is deformed.

2. The bicycle speed change assembly according to claim 1, wherein said guide pulley travel control means is provided by slanting pivotal shafts for said inner and outer links relative to the vertical so that said guide pulley is moved inward axially of the hub shaft and forwardly downward substantially along a radial path of said sprocket cluster when said pantograph mechanism is deformed.

3. The bicycle speed change assembly according to claim 1, wherein said guide pulley travel control means is provided by displacing a rotation shaft for said guide pulley from said shaft for said chain guide so that, when said pantograph mechanism is deformed, said guide pulley is moved inward axially of the hub shaft while said guide pulley is also moved forwardly downward substantially along a radial path of said sprocket cluster by the pivotal movement of said chain guide attendant with variation of chain tension.

4. The bicycle speed change assembly according to claim 1, wherein said guide pulley travel control means is provided by slanting pivotal shafts for said inner and outer links relative to the vertical and by displacing a rotation shaft for said guide pulley from said shaft for said chain guide so that, when said pantograph mechanism is deformed, said guide pulley is moved inward axially of the hub shaft while said guide pulley is also moved forwardly downward substantially along a radial path of said sprocket cluster by the pivotal movement of said chain guide attendant with variation of chain tension.

5. The bicycle speed change assembly according to claim 1, wherein said pantograph mechanism is deformed by a speed change control cable connected to said pantograph link mechanism from ahead thereof.

6. The bicycle speed change assembly according to claim 1, wherein said speed change control cable comprises an inner cable and a sheathing outer cable, an end of said outer cable being fastened to said link base, said inner cable extending out of said outer cable for connection to said inner or outer link of said pantograph link mechanism.

7. The bicycle speed change assembly according to claim 1, wherein said speed change control cable comprises an inner cable and a sheathing outer cable, an end of said outer cable being fastened to an appropriate portion of said chain stay ahead of said pantograph mechanism, said inner cable extending straightly out of said outer cable substantially along said chain stay for connection to said inner or outer link of said pantograph link mechanism.

8. The bicycle speed change assembly according to claim 1, wherein said speed change control cable comprises only an inner cable, an end of said inner cable being fastened to an speed change operation unit, an intermediate path of said inner cable being extending straightly rearward substantially along said chain stay, the other end of said inner cable being connected to said inner or outer link of said pantograph mechanism.

* * * * *

UNITED STATES PATENT AND TRADEMARK OFFICE
CERTIFICATE OF CORRECTION

PATENT NO. : 5,380,252

DATED : January 10, 1995

INVENTOR(S) : Yoshihisa Iwasaki, et al

It is certified that error appears in the above-indentified patent and that said Letters Patent is hereby corrected as shown below:

On the title page: Item [63]

The international application number has been recorded incorrectly. The correct international application No. is PCT/JP91/01702.

Signed and Sealed this

Sixteenth Day of May, 1995

BRUCE LEHMAN

*Attest:*

*Attesting Officer*      *Commissioner of Patents and Trademarks*